Patented May 11, 1943

2,319,189

UNITED STATES PATENT OFFICE 2,319,189

MINERAL OIL COMPOSITION AND IMPROVING AGENT THEREFOR

Orland M. Reiff, Woodbury, N. J., assignor to Socony-Vacuum Oil Company, Incorporated, New York, N. Y., a corporation of New York No Drawing. Application April 19, 1940,
Serial No. 330,532

16 Claims. (Cl. 252—48)

This invention has to do in a general way with mineral oil compositions and is more particularly related to mineral oil compositions of the lubricant type to which an agent has been added in a minor proportion for the purpose of improving the oil in certain respects. It is an object of this invention to provide a novel class of mineral oil addition agents which will improve one or more important properties of a mineral oil fraction. It is a further object to provide improved mineral oil compositions containing these novel addition agents.

In my copending application Serial No. 222,755, filed August 3, 1938 (Patent 2,197,835), of which this application is a continuation in part, I have described as mineral oil addition agents a general class of metalorganic compounds which are characterized by the presence of a wax-substituted aryl nucleus, such addition agents being of multifunctional properties in that they are effective to reduce the pour point, improve the viscosity index, and retard the deleterious effects of oxidation in the oil to which they are added. The present invention is predicated upon the discovery that the sulfur derivatives or, more specifically, the sulfides (monosulfides and polysulfides) of metalorganic compounds of the type described in the aforesaid application are improved in certain respects over the corresponding metalorganic compounds from which the sulfides may be considered as having been obtained. In addition to the sulfides or sulfur derivatives my invention also contemplates the corresponding derivatives of the related elements, selenium and tellurium.

More specifically, the present invention is concerned with metalorganic condensation products of sulfur, selenium, or tellurium corresponding in general to the alkyl-substituted aromatic-carboxylic acid salts disclosed in copending application Serial No. 300,010, filed October 18, 1939 (Patent 2,198,275), of which I am a coinventor. The addition agents of the present invention are, like those of this last-mentioned application, characterized by the presence of an aromatic nucleus in which at least one nuclear hydrogen atom is substituted with an oil-solubilizing alkyl group and in which at least one other nuclear hydrogen atom is substituted with an organic (preferably aliphatic or cycloaliphatic) carboxylic acid salt radical wherein the carboxyl hydrogen is substituted with its equivalent weight of metal.

The addition agents of the present application are distinguished from those of application No. 300,010 in that at least two of the alkylated aromatic-aliphatic acid salt radicals are interconnected by at least one atom of an element selected from the group consisting of sulfur, selenium, or tellurium. Through introduction of sulfur, for example, in the manner or manners to be hereinafter described, I obtain what may be broadly termed a sulfide of an alkyl-substituted aromatic-aliphatic carboxylic acid salt in which the carboxyl hydrogen is substituted with its equivalent weight of metal. The term "aliphatic" as used herein to designate the aliphatic acid salt substituent is inclusive of straight and branched chain aliphatic groups and cycloaliphatic groups, which may or may not carry other substituents.

The class of sulfides of alkylated aromatic-aliphatic carboxylic acid salts (or carboxylates) contemplated herein distinguishes over the corresponding carboxylates of copending application No. 300,010 in that the sulfides have increased effectiveness in retarding the deleterious effects of oxidation in the oil. In the preferred class of multifunctional addition agents, I have found that the sulfides possess improved properties for inhibiting against the formation of oxidation products in the oil over the corresponding carboxylates or salts of copending application No. 300,010. The improved inhibiting properties are particularly significant in retarding the development of acidity in certain types of oils and under certain conditions of use.

The property of oil-miscibility—that is, of remaining uniformly suspended in the oil under normal conditions of handling and use—is imparted to the condensation products contemplated herein by the alkyl substituent on the aryl nucleus. This substituent, therefore, should be derived from an aliphatic hydrocarbon of sufficiently high molecular weight, or the aryl nucleus should be sufficiently substituted (or alkylated), to render the product oil-miscible. The degree of substitution necessary to accomplish this will vary with the character of the aromatic nucleus (monocyclic or polycyclic) and also with the character of the organic group in the organic acid substituent. A long chain aliphatic group in the organic acid salt substituent, such as a stearic acid group, for example, will require less substitution of the aryl nucleus than a short chain aliphatic acid group such as acetic acid. For obtaining the preferred product having multifunctional properties, the alkyl substituent, as aforesaid, should correspond to an aliphatic hydrocarbon having at least twenty carbon atoms. A petroleum wax such as paraffin wax constitutes a preferred source for these so-called "heavy" alkyl substituents, and for that reason the preferred multifunctional compounds may be hereinafter designated as "wax-substituted." It is to be understood, however, that the term "wax" as used in this regard is not restricted to substituent groups derived from petroleum wax but is intended to include substituent groups derived from any aliphatic hydrocarbon or mixture thereof or any predominantly aliphatic material which is, in character or constituents, similar to the constituents of petroleum wax.

The condensation products of alkyl-substituted aromatic-aliphatic carboxylic acid salts of the type contemplated herein as oil addition agents may be characterized by the general formula:

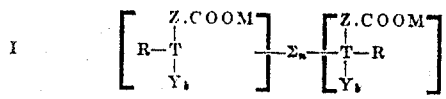

in which T represents a monocyclic or a polycyclic aromatic nucleus; $\Sigma$ represents sulfur, selenium, or tellurium; and $n$ represents a whole number from one to four. The group Z.COOM represents what may be broadly termed an organic carboxylic acid salt group in which Z is preferably an aliphatic or cycloaliphatic hydrocarbon group attached to T and COOM represents a carboxyl group attached to Z, the carboxyl hydrogen thereof being substituted with its equivalent weight of a metal M. R represents at least one oil-solubilizing alkyl group which for the preferred multifunctional compounds is at least one alkyl group containing at least twenty carbon atoms, hereinabove identified as a "wax" group. In addition to the oil-solubilizing alkyl group R, the characterizing aryl nucleus T may contain hydrogen as added hydrogen obtained by hydrogenation or it may contain residual hydrogen a part or all of which may, in turn, be substituted with a substituent or substituents having a positive or negative or neutral oil-solubilizing effect. Such hydrogen or substituents are indicated by $Y_b$ in general Formula I, wherein Y may be defined as selected from the group consisting of hydrogen, hydroxyl, metal-oxy, ester, keto, alkoxy, alkyl sulfide, aryl sulfide, aroxy, ether alcohol, aldehyde, thioaldehyde, oxime, amido, thioamido, carbamido, aralkyl, aryl, alkaryl, halogen, nitroso, amino, nitrosamino, amidino, imino, N-thio, diazo, hydrazino, cyano, azoxy, azo, and hydrazo radicals, and $b$ represents the number of Y's and is equal to zero or a whole number corresponding to the number of available hydrogens on the nucleus T not substituted with R, .Z.COOM, and $\Sigma_n$.

In general it appears that any metal may be employed as the metal M in compounds or condensation products of the aforesaid type to provide valuable oil addition agents. The metals contemplated herein may be broadly classified as metals of groups I to VIII inclusive of the periodic system. These metals comprise the following: the alkali metals: lithium, sodium, potassium, rubidium, and caesium; the alkaline earth group: beryllium, magnesium, calcium, strontium, and barium; the metals zinc, cadmium, mercury, scandium; the metals aluminum, gallium, indium, thallium, titanium, zirconium, cerium, thorium, germanium, tin, and lead; vanadium, columbium, and tantalum; arsenic, antimony, and bismuth; chromium, molybdenum, tungsten, and uranium; rhenium, manganese, iron, cobalt, and nickel; ruthenium, rhodium, and palladium; osmium, iridium, and platinum.

Some of the rare earth metals are given in the foregoing. Other rare earth metals suitable for use in the "aliphatic carboxylate" group (.Z.COOM) of these condensation products are those now commercially available as the cerium and yttrium group, namely, a mixture of praseodymium, neodymium, samarium, europium, gadolinium, terbium, dypsprosium, holmium, erbium, thallium and lutecium.

The selection of a metal will, of course, depend to a certain extent upon the character of the oil in which the addition agent is to be added and the conditions under which it is to be used. Certain metals such as lead, zinc, and tin, for example, may contribute to the oiliness characteristics of the oil. For use in addition agents for internal combustion engine lubricants, my present work indicates tin as being a specially preferred metal.

As aforesaid, the aryl nucleus T may be mono or polycyclic, corresponding, for example, to benzene, naphthalene, and anthracene and their derivatives. A typical condensation product in which the aryl nucleus is monocyclic and is otherwise unsubstituted may in its simplest form be represented by the general formula:

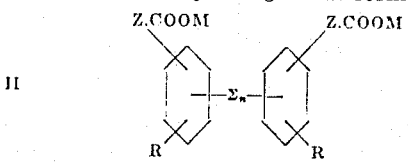

A preferred group of condensation products wherein the nucleus T carries a Y substituent other than residual hydrogen is one derived from an alkylated hydroxyaromatic compound such as wax substituted phenol. Such a derivative in its simplest form may be represented by the formula:

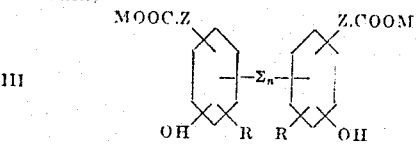

Another typical desirable condensation product having a Y substituent is one in which Y is an ether group (aroxy or alkoxy) which may, in its simplest form be represented by the formula:

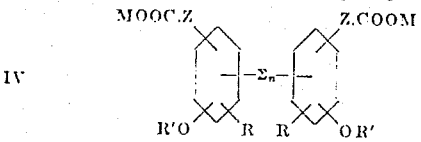

in which R' represents an alkyl or an aryl group.

Since the condensation reaction employed in synthesizing the sulfides (or corresponding selenides and tellurides) may be attended by further condensation, such further condensed products (hereinafter termed "polymers") are contemplated herein as coming within the general Formula I above and the terms "sulfides," "condensation products" etc. are used herein to identify and define these oil addition agents. Polymers of this character which may be associated with or formed instead of the simple condensation product of Formula II may be represented by the following formula:

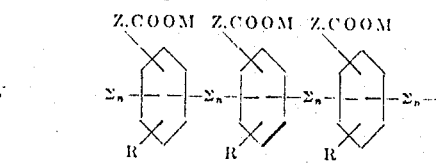

Also where synthesis of the condensation product employs as an initial reactant, a wax substituted phenol obtained by the Friedel-Crafts condensation of phenol with a halogenated aliphatic material of at least twenty carbon atoms, such condensation may result in the formation of a "wax-phenol" in which two or more phenol groups are interconnected by one or more aliphatic hydrocarbon chains. Compounds of this type when converted to the wax substituted phenol aliphatic acids and further reacted to form the metal carboxylates of phenol aliphatic acid sulfides may result in the formation of condensation products corresponding to the formula:

VI. 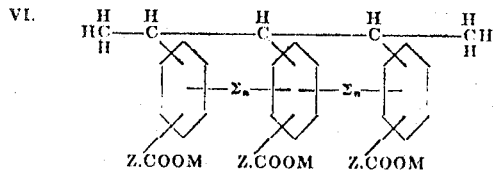

or compounds of the formula:

VII. 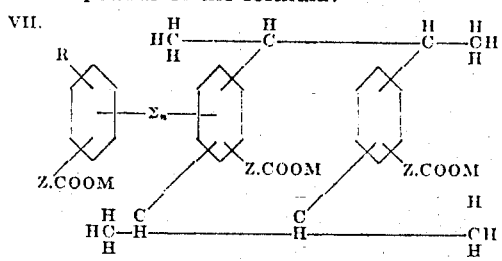

in which the chains represent the oil solubilizing alkyl substituents R of general Formula I.

The foregoing discussion pertaining to Formulae II to VII inclusive is not intended as a development of the specific molecular compositions or structure of condensation products constituting the mineral oil addition agents contemplated herein, but is merely intended as indicative of the possible composition of such addition agents. These addition agents may be broadly characterized as the sulfides (or the corresponding selenides or tellurides) of alkylated aromatic-aliphatic acid salts or the sulfides of alkylated aromatic-aliphatic carboxylic acids in which the carboxyl hydrogen is substituted with its equivalent weight of metal. The sulfur condensation products may also be characterized as metal carboxylates of alkylated aromatic-aliphatic acid sulfides.

As aforesaid the term "sulfide" as used herein is inclusive of the monosulfides, disulfides, trisulfides, tetrasulfides, etc.; that is it includes both monosulfides and polysulfides and it is also intended to include such polymers and related derivatives as may be formed by the hereinafter described typical procedures which may be employed to synthesize the condensation products contemplated herein. It is also pointed out that the so-called polymer products typified by Formulae VI and VII are included under general Formula I since these polymers are characterized by having therein at least one grouping typified by general Formula I.

The sulfides or sulfur derivatives of alkylated aromatic-aliphatic acid salts are the preferred class of condensation products contemplated herein, and for that reason the invention will be specifically described in connection with the sulfur derivatives, although, as aforesaid, the corresponding selenides and tellurides are contemplated as coming within the scope of the invention.

One general procedure for synthesizing the sulfides of alkylated aromatic-aliphatic acid salts is to react the corresponding alkylated aromatic-aliphatic acid with a sulfur halide to form the sulfide of the acid and then substitute the carboxyl hydrogen thereof with metal. In the event sulfur dichloride ($SCl_2$) is used in this general procedure, the condensation product will be in the nature of a monosulfide (or polymer thereof); sulfur monochloride ($S_2Cl_2$) will yield the corresponding disulfide (or polymer thereof) and a mixture of sulfur monochloride and sulfur dichloride may be employed to obtain a corresponding mixture of condensation products. Elementary sulfur may be employed as the condensation reagent, but this is not considered the most desirable procedure.

Sulfur derivatives of higher sulfur content may be obtained by reacting a condensation product having the disulfide linkage with sulfur or with alkali polysulfide or with an alkyl tetrasulfide. Such higher sulfur derivatives may also be obtained by first reducing the disulfide to form a thiophenol of the alkylated aromatic-aliphatic acid and then reacting the thiophenol with sulfur dichloride (to form the trisulfide) or with sulful monochloride (to form the tetrasulfide).

The alkylated aromatic-aliphatic acids used in preparing the sulfur, selenium or tellurium condensation products from which the corresponding metal carboxylates are formed, may be obtained in various ways. Details in desirable procedures for obtaining the preferred wax-substituted aromatic-aliphatic acids are described in the aforesaid copending application 300,010 where such acids are intermediate products in the formation of the wax substituted aromatic-aliphatic acid salts described and claimed in that application.

The first step in synthesizing the sulfide of alkylated aromatic-aliphatic acid salts, is to prepare the alkylated aromatic compound. This, for the preferred multifunctional compounds, involves first condensing a high molecular weight aliphatic hydrocarbon material with the desired aromatic compound, which, as aforesaid, may carry other substituents such as a hydroxyl group, an aroxy group or the like. In this condensation reaction pure or substantially pure high molecular weight aliphatic compounds may be employed, or the aliphatic material may be a mixture predominantly comprised of aliphatic compound having at least twenty carbon atoms, such a mixture being typified by a petroleum wax such as paraffin wax. The condensation may be effected by first halogenating the aliphatic material and condensing same with aromatic material by means of a Friedel-Crafts catalytic reaction (described in detail in application 300,010). The alkylation may also be carried out with high molecular weight unsaturated aliphatic hydrocarbons or with high molecular weight alcohols, using sulfuric acid or aluminum chloride as a catalyst. Also the high molecular weight alcohol may be converted to an alkyl halide and condensed with the aromatic material by means of the Friedel-Crafts reaction.

Since paraffin wax or broadly petroleum wax is considered to be a preferred source for the heavy alkyl substituent, such preferred alkyl substituted aromatic compounds for obtaining alkylated aryl aliphatic acid salts of multifunctional properties may be referred to herein as wax-aryl compounds. By this term it is to be understood that I intend to include equivalent alkylated aromatics in which the alkyl substituent is derived from pure or mixed aliphatic compounds or materials equivalent in character to those in petroleum wax and it is also to be understood that there are included wax aryl compounds in which the aryl nucleus contains another or other substituents such as an hydroxyl group, an ether group or the like.

In obtaining the wax aryl compounds I may employ, for example, a chlorinated petroleum wax having from 10 percent to 16 percent chlorine content. The degree of alkylation of the product may be varied by varying the chlorine content of the aliphatic material (wax) and the ratio of chlorinated wax and aromatic compound in the reaction mixture. A convenient means of indicating this degree of alkylation is by means of a parenthetical expression (A—B) in which A indicates the atomic proportions of chlorine per mol of aromatic compound in the mixture and B indicates the percentage chlorine content of the chlorinated material. Thus "wax-phenol (3-16)" indicates that 3 atomic proportions of chlorine (a chlorinated wax of 16 percent chlorine content) were present for each mol of phenol in the reaction mixture. This same expression will be used in connection with derivatives of the alkylated aromatic compound, as, for example, the metal carboxylates of wax-phenol-stearic acid sulfide (3-16).

After obtaining the wax-aromatic condensation product, such product is condensed with an aliphatic or cyclo-aliphatic carboxylic acid to obtain the wax substituted aromatic-alkyl carboxylic acid. Specific procedures which may be followed in effecting the condensation between the wax-aromatic compound and the aliphatic acid are as follows:

(a) Condensation of alkylated aromatic or hydroxyaromatic compounds with unsaturated aliphatic acids such as oleic acid, using a so-called kationoid catalyst such as sulfuric acid, zinc chloride, aluminum chloride, etc., to effect the addition of the unsaturated acid to the aryl nucleus.

(b) Condensation of an alkylated aromatic or hydroxyaromatic hydrocarbon with halogenated aliphatic or cyclo-aliphatic acids, such as chloracetic, chlorstearic and chlornaphthenic acids, by means of the Friedel-Crafts reaction using anhydrous aluminum chloride as the preferred catalyst.

(c) In the case of acids of the type contemplated herein which contain a hydroxyl substituent in the aromatic nucleus, such acids may be prepared by a rearrangement of the corresponding alkylated aryl ether aliphatic acids in the presence of a kationoid catalyst such as HCl gas.

(d) Hydroxyl-aliphatic acids can be converted to the corresponding ether aryl-aliphatic acids by methylating the hydroxyl group by reaction with alkylating agents like dimethyl sulphate or alkyl halides or by reaction with arylating agents such as aryl halides.

When it is desired to obtain a compound or condensation product in which the characterizing aryl nucleus contains, in addition to or instead of residual hydrogen and the heavy alkyl group or groups and alkyl-carboxyl group, a substituent of the type classified in general Formula I as $Y_b$, it is pointed out that, with the exception of substituents such as hydroxyl, aroxy, aralkyl, aryl, alkaryl, and halogen, such Y groups are introduced after alkylation and introduction of the alkyl-carboxyl group. The usual methods for introduction of these last mentioned Y substituents into non-alkylated aromatic compounds may be employed in connection with the alkylated aromatic-alkyl acids and it is to be understood that the introduction of these substituents into the aromatic nucleus will in some cases be accompanied by similar substitution in the heavy alkyl substituent and in the aliphatic acid group.

Examples of the aromatic compounds which may be used as starting materials for the alkylation or wax-condensation reaction for obtaining either a product in which the aromatic nucleus is otherwise unsubstituted or a product in which the aromatic nucleus carries a hydroxyl group are as follows: benzene, naphthalene and anthracene (either substituted or unsubstituted); phenol, resorcinol, hydroquinone, catechol, cresol, hydroxyl-diphenyl, benzlyphenol, alpha- and beta-naphthol and beta-methylnaphthol, anthranol, phenyl-methylnaphthol, etc.; and aryl ethers such as diphenyl ether and naphthyl ether, or mixed alkyl-aryl or aralkyl-aryl ethers such as anisole, naphthylmethyl ether and benzylphenyl ether. Preference in general, as has been previously indicated, is to the mono- and poly-cyclic aromatics (preferably naphthalene) and to the mono-hydroxyphenols otherwise unsubstituted, particular preference being given to phenol and alpha- and beta-naphthol.

As sources for the heavy alkyl multifunctional imparting substituent we prefer to use, as has been previously indicated, a mixture of high molecular weight aliphatic hydrocarbons such as characterize petroleum wax, particular preference being given to paraffin wax.

Other sources of the heavy alkyl substituent are high molecular weight unsaturated aliphatic hydrocarbons such as polymerized iso-butylene, dodecylene, tetra-decylene, octa-decylene, melene, etc., and high molecular weight alcohols, such as myricyl alcohol, ceryl alcohol, etc. Although the above mentioned aromatic compounds can be alkylated by direct reaction with high molecular weight alcohols, the preferred procedure consists in conversion of the alcohol to the corresponding halide (or polyhalide), followed by condensation of the alkyl halide with the aromatic compound by the Friedel-Crafts reaction.

As has been previously indicated, the alkyl carboxylate substituent may be derived from any aliphatic or cyclo-aliphatic mono- or poly-basic carboxylic acid, illustrative sources of which are acetic, benzoic, butyric, valeric, heptylic, nonylic, palmitic and stearic acids, which typify saturated acids, and must be used as the corresponding chlor-acid in which substitution takes place at the alpha carbon atoms of the aliphatic acid group. Other aliphatic acid substituents may be obtained by using unsaturated carboxylic acids of the oleic series, $C_nH_{2n-2}O_2$, in which case substitution on the nucleus takes place at the double bond in the unsaturated acid. Halogenated cyclo-aliphatic acids such as chlor-naphthenic acid may be used to obtain compounds in which the alkylated aromatic group carries a cyclo-aliphatic substituent. The term "alkyl" or "aliphatic" when used herein in connection with the aliphatic carboxylate substituent is intended as inclusive of both aliphatic and cyclo-aliphatic acid groups or radicals.

As aforesaid the preferred procedure for obtaining the sulfides from the alkyated aromatic-aliphatic acids involves reacting the acid with a sulfur halide. This may be accomplished by dissolving the alkylated aromatic-aliphatic acid or mineral oil solution thereof in a suitable solvent such as carbon disulfide, benzene, chlorbenzene, ethylene dichloride, Stoddard Solvent or the like. The temperature of the solution may be brought up to about 100° F., and a sulfur chloride or a mixture of sulfur chlorides is added in the ratio of about ½ mol per mol of the acid.

The addition of the sulfur halide should be sufficiently slow to prevent the temperature substantially exceeding 100° F. and the mixture may be held at that temperature for about one hour to complete formation of the sulfur derivative. Hydrogen chloride is evolved in the reaction resulting in fixation of the sulfur in the aryl nucleus.

As regards the temperature of the reaction it is to be understood that the reaction can be carried out at various temperatures from room temperature up to the boiling point of the solvent, but it is preferable for obtaining light colored products that the temperature be not too high.

After completion of the sulfur condensation the reaction mixture is water washed to remove dissolved hydrochloric acid and the free alkylated aromatic alkyl carboxylic acid is converted to its corresponding alkali metal salt or carboxylate by reaction with an alkali alcoholate. Salts of other metals are obtained by double decomposition of the alkali salt with a normal inorganic or fatty acid salt or oxy salt of the desired metal carrying out the reaction in aqueous or non aqueous medium. When the reaction is carried out in aqueous medium, it is suitable to form the alkali salt by reaction with an aqueous solution of sodium hydroxide in place of an alkali alcoholate. If it is desired to obtain a condensation product in which the aryl nucleus carries a metal oxy substituent (a metal phenate-metal carboxylate salt of an alkylated phenol aliphatic acid sulfide) the metallizing reaction is carried out in a non-aqueous medium. Another desirable procedure for formation of the salts of polyvalent metals, consists in reacting the free alkylated aromatic alkyl acid with an alcoholate of the desired metal. This reaction is carried out most readily by adding the inorganic salt in alcohol solution to the free acid, followed by addition of an equivalent amount of alkali alcoholate, whereby the alcoholate of the polyvalent metal is formed in the reaction mixture.

Further details in typical procedures which may be followed in synthesizing the metal carboxylates of alkylated aromatic-aliphatic acid sulfides contemplated herein as oil improving agents will appear from the following examples:

EXAMPLE ONE

STANNOUS CARBOXYLATE OF WAX-PHENOL STEARIC ACID DISULFIDE

*Reaction mixture*

| | Parts by weight |
|---|---|
| Wax-phenol stearic acid (3–14) | 100 |
| Mineral oil of 67 sec. Saybolt vis. at 210° F. as diluent | 300 |
| Sulfur monochloride | 5.05 |
| Sodium (dissolved in butanol as sodium butylate) | 3.46 |
| Stannous chloride (anhydrous) | 7.1 |

*Reaction procedure*

Wax phenol stearic acid is prepared by the condensation of wax phenol (3–14) with oleic acid according to the procedure described in Examples 1(a)–(b) of the aforesaid Patent 2,198,275, followed by diluting with mineral oil and converting to the sodium phenate-sodium carboxylate salt by reaction with sodium butylate by heating a mixture thereof at the reflux temperature (about 225° F.) for one hour. The sodium salt is then further diluted with butanol until the mixture can be stirred readily at 100° F., followed by addition of the $S_2Cl_2$ at this temperature at a rate sufficiently slow to avoid appreciable temperature rise by the heat of reaction developed. The mixture is then stirred at this temperature about one hour to complete the sulfurization. In the reaction with sulfur monochloride, one-half of the sodium is neutralized by reaction with hydrochloric acid, leaving the sodium carboxylate of the wax phenol stearic acid disulfide as the reaction product. The stannous salt is then formed by adding the stannous chloride in solution in butanol, and heating at the reflux temperature about one hour, whereby double decomposition takes place between the stannous chloride and the sodium salt to form the stannous carboxylate of wax phenol stearic acid disulfide. The alcohol is then distilled and the reaction product is filtered through "Hi-Flo" to remove sodium chloride. The product is then steam treated at about 300° F. until all traces of alcohol solvent are removed. Upon cooling, vacuum is applied or a current of nitrogen is run through the mixture to remove water vapor to obtain the finished product, which is approximately a ¼ blend in mineral oil.

EXAMPLE TWO

STANNOUS PHENATE-STANNOUS CARBOXYLATE OF WAX PHENOL STEARIC ACID DISULFIDE

*Reaction mixture*

| | Parts by weight |
|---|---|
| Wax-phenol stearic acid (3–14) | 100 |
| Mineral oil of 67 sec. Say. vis. at 210° F. as diluent | 300 |
| Sodium (dissolved in butanol as sodium butylate) | 5.19 |
| Sulfur monochloride | 5.05 |
| Stannous chloride (anhydrous) | 14.2 |

*Reaction procedure*

The sodium salt of the wax-phenol stearic acid disulfide is formed by the procedure of Example One. In order to substitute both the phenolic (OH) group and the carboxyl group with tin, the stannous chloride in butanol solution is added, followed by addition of sodium butylate equivalent to the phenol content. One equivalent of stannous butylate and one equivalent of stannous chloride are then available for reaction with the sodium salt of the wax-phenol stearic acid disulfide. The reaction mixture is then raised to reflux temperature (about 225° F.) and stirred about one hour to complete the reaction. The alcohol is then distilled and the reaction mixture is filtered and steamed as carried out in Example One, to obtain the finished product.

EXAMPLE THREE

STANNOUS CARBOXYLATE OF WAX-PHENOXY PHENYL STEARIC ACID DISULFIDE

*Reaction mixture*

| | Parts by weight |
|---|---|
| Wax-phenoxy phenyl stearic acid (3–16) | 100 |
| Mineral oil of 67 sec. Say. vis. at 210° F. or diluent | 200 |
| Sulfur monochloride | 6.0 |
| Sodium (dissolved in butanol or sodium butylate) | 2.0 |
| Stannous chloride (anhydrous) | 8.5 |

*Reaction procedure*

Wax-phenoxy phenyl stearic acid is prepared by the condensation of wax-phenyl ether (3–16) with oleic acid according to the procedure described in Example 3(a) of Patent 2,198,275, followed by diluting with mineral oil and converting to the sodium salt by reaction with sodium butylate by heating a mixture thereof at the reflux temperature of the butanol for one hour. The sulfur monochloride is then added at about 100° F. at a rate regulated to prevent appreciable temperature rise by the heat of reaction developed. The mixture is then stirred at this temperature one hour to complete the sulfurization. In the reaction with the sulfur monochloride, the sodium salt is neutralized by reaction with the hydrochloric acid formed, resulting in formation of the wax-phenoxy phenyl stearic acid disulfide as reaction product. In order to form the stannous salt, the stannous chloride is added to the free acid, followed by addition of an equivalent amount of sodium butylate and heating at the reflux temperature about one hour to complete the reaction. In this reaction, stannous butylate is formed by reaction of the stannous chloride with the sodium butylate, which in turn is reacted with the carboxyl group to form the stannous carboxylate derivative. The alcohol is then distilled and the reaction product is filtered to remove sodium chloride. The product is then steam-treated at about 300° F. to remove any traces of solvent. Upon cooling, vacuum is applied or a current of nitrogen is run through the mixture to remove water vapor to give the finished product.

To demonstrate the improved properties obtained in mineral oil blends containing addition agents of the type discussed herein, I have conducted several comparative tests with representative mineral oils alone and with the same oils blended with representative metal carboxylates of alkylated aromatic-aliphatic carboxylic acid sulfides. The results of such tests are discussed in the following examples:

EXAMPLE A

Pour point depression

These tests were conducted with a motor oil having a Saybolt viscosity of 67 seconds at 210° F. and a pour point of +20° F. The pour point of blends formed from this oil and representative addition agents of the type contemplated herein are listed in Table I below, from which it will be observed that these addition agents are effective pour point depressants when the alkyl substituent is derived from a high molecular weight aliphatic material such as petroleum wax.

TABLE I

| Addition agent | Conc. by weight | A. S. T. M. pour point |
|---|---|---|
| | Per cent | °F. |
| Stannous carboxylate of wax-phenol stearic acid disulfide (3–14) | ¼ | −15 |
| Stannous phenate-stannous carboxylate of wax-phenol stearic acid disulfide (3–14) | ¼ | −10 |
| Stannous carboxylate of wax-phenoxy phenyl stearic acid disulfide (3–16) | 1 | −15 |
| Cobaltous carboxylate of wax-phenoxy phenyl stearic acid disulfide (3–16) | 1 | 0 |

EXAMPLE B

Viscosity index improvement

The data listed in Table II below showing the effectiveness of typical addition agents contemplated herein for improving viscosity index (V. I.) were obtained in the conventional manner from the Saybolt viscosity (Say. vis.) of the oil and the oil blends at 100° F. and 210° F. The oil used was a viscous mineral oil of the lubricant type.

TABLE II

| Addition agent | Conc. by wt. | Say. vis. 100° F. | Say. vis. 210° F. | V. I. |
|---|---|---|---|---|
| | Per cent | | | |
| None | | 140.7 | 41.8 | 79.3 |
| Stannous carboxylate of wax-phenol steric acid disulfide (3–14) | 1 | 114.6 | 42.3 | 86.6 |
| Stannous phenate-stannous carboxylate of wax-phenol stearic-acid disulfide (3–14) | 1 | 147.8 | 42.8 | 94.1 |
| Stannous carboxylate of wax-phenoxy phenyl stearic acid disulfide (3–16) | 1 | 152.3 | 42.7 | 84.2 |
| Cobaltous carboxylate of wax-phenoxy phenyl stearic acid disulfide (3–16) | 1 | 151.0 | 43.7 | 86.3 |

EXAMPLE C

Oxidation-inhibition

In addition to the foregoing tests I have also made comparative tests between an oil and an oil blend containing representative improving agents of the type contemplated herein to determine the comparative behavior of the unblended oil and the improved oil under actual operating conditions. The tests were carried out in a single cylinder Lauson engine operated continuously over a time interval of 16 hours with the cooling medium held at a temperature of about 212° F. and the oil temperature held at about 280° F. The engine was operated at a speed of about 1830 R. P. M.

The oil used in the test was a lubricating oil stock of 45 sec. Saybolt viscosity at 210° F. and the conditions observed were:

a. The amount of naphtha insoluble material formed in the oil.

b. The neutralization number or acidity (N. N.) of the oil.

c. The S. U. V. of the oil before and after the test.

In running these tests, comparative runs were made with a sample of the blank oil for each sample of oil containing the addition agent. In Table III below, these blank oil samples are indicated by $A_1$, $A_2$, etc.; and oils with addition agents used in corresponding runs are indicated by $B_1$, $B_2$, etc. The oil blends contained addition agents as follows:

$B_1$ = ½% stannous phenate-stannous carboxylate of wax-hydroxyphenyl stearic acid disulfide (3–14)

$B_2$ = ½% chromous phenate-chromous carboxylate of wax-hydroxyphenyl stearic acid disulfide (3–14)

$B_3$ = ½% stannous carboxylate of wax-phenoxyphenyl stearic acid disulfide (3–16)

$B_4$ = ½% stannous carboxylate of wax-naphthyl stearic acid disulfide (3–16)

TABLE III

| Oil | S. U. V. at 210° F. | N. N. | Per cent naphtha insolubles |
|---|---|---|---|
| $A_1$ | 58.2 | 10.0 | 0.11 |
| $B_1$ | 45.9 | 0.3 | 0.22 |
| $A_2$ | 63.3 | 12.9 | 0.36 |
| $B_2$ | 48.5 | 2.6 | 0.27 |
| $A_3$ | 52.5 | 8.4 | 0.18 |
| $B_3$ | 46.1 | 0.2 | 0.29 |
| $A_4$ | 69.1 | 8.1 | 0.75 |
| $B_4$ | 48.3 | 2.7 | 0.29 |

The amount of improving agent used in the oil may be varied, depending upon the character of the oil with which it is blended and the properties desired in the final oil composition. The sulfides of alkylated aromatic-aliphatic acid salts contemplated herein may be used in amounts ranging from about ⅛ per cent to about 10 per cent, and in general mineral oil compositions of the desired improved properties may be obtained with amounts in the neighborhood of 1 per cent by weight.

It is to be understood that while I have described certain preferred procedures which may be followed in the preparation of these sulfides of alkylated aromatic-aliphatic acid salts and have referred to various representative constituents thereof, such procedures and constituents are for illustrative purposes only. The invention, therefore, is not to be construed as limited by the specific examples given but includes within its scope such changes and modifications as fairly come within the spirit of the appended claims.

I claim:

1. An improved mineral oil composition comprising a mineral oil having admixed therewith in minor proportion an oil-miscible condensation product characterized by at least two aromatic nuclei, each of which is substituted with at least one oil-solubilizing alkyl group and with at least one aliphatic carboxylic acid group wherein the carboxyl hydrogen is substituted with metal, the said characterizing nuclei being interconnected by at least one atom of an element selected from the group consisting of sulfur, selenium, and tellurium.

2. An improved mineral oil composition comprising a mineral oil having admixed therewith in minor proportion an oil-miscible condensation product characterized by at least two aromatic nuclei, each of which has at least one nuclear hydrogen atom substituted with an hydroxyl group and each characterizing nucleus being further substituted with at least one oil-solubilizing alkyl group and with at least one aliphatic carboxylic acid group wherein the carboxyl hydrogen is substituted with metal, the said characterizing nuclei being interconnected by at least one atom of an element selected from the group consisting of sulfur, selenium, and tellurium.

3. An improved mineral oil composition comprising a mineral oil having admixed therewith in minor proportion an oil-miscible condensation product characterized by at least two aromatic nuclei, each of which is substituted with at least one oil-solubilizing alkyl group having at least twenty carbon atoms and with at least one aliphatic carboxylic acid group wherein the carboxyl hydrogen is substituted with metal, the said characterizing nuclei being interconnected by at least one atom of an element selected from the group consisting of sulfur, selenium, and tellurium.

4. An improved mineral oil composition comprising a mineral oil having admixed therewith in minor proportion an oil-miscible condensation product characterized by at least two aromatic nuclei, each of which has at least one nuclear hydrogen atom substituted with an hydroxyl group and each characterizing nucleus being further substituted with at least one oil-solubilizing alkyl group having at least twenty carbon atoms and with at least one aliphatic carboxylic acid group wherein the carboxyl hydrogen is substituted with metal, the said characterizing nuclei being interconnected by at least one atom of an element selected from the group consisting of sulfur, selenium, and tellurium.

5. An improved mineral oil composition comprising a mineral oil having admixed therewith a minor proportion of an oil-miscible sulfide of a wax-substituted aromatic-aliphatic carboxylic acid salt in which the carboxyl hydrogen is substituted with its equivalent weight of metal.

6. An improved mineral oil composition comprising a mineral oil having admixed therewith a minor proportion of an oil-miscible monosulfide of a wax-substituted aromatic-aliphatic carboxylic acid salt in which the carboxyl hydrogen is substituted with its equivalent weight of metal.

7. An improved mineral oil composition comprising a mineral oil having admixed therewith a minor proportion of an oil-miscible polysulfide of a wax-substituted aromatic-aliphatic carboxylic acid salt in which the carboxyl hydrogen is substituted with its equivalent weight of metal.

8. An improved mineral oil composition comprising a mineral oil having admixed therewith a minor proportion of an oil-miscible sulfide of a wax-substituted aromatic-aliphatic carboxylic acid salt in which the carboxyl hydrogen is substituted with its equivalent weight of metal and in which at least one nuclear hydrogen atom of the characterizing wax-substituted aromatic nucleus is substituted with an hydroxyl group.

9. An improved mineral oil composition comprising a mineral oil having admixed therewith a minor proportion of an oil-miscible sulfide of a wax-substituted aromatic-aliphatic carboxylic acid salt in which the carboxyl hydrogen is substituted with its equivalent weight of metal and in which at least one nuclear hydrogen atom of the characterizing wax-substituted aromatic nucleus is substituted with a metal-oxy group.

10. An improved mineral oil composition comprising a mineral oil having admixed therewith a minor proportion of an oil miscible sulfide of a wax-substituted aromatic-aliphatic carboxylic acid salt in which the carboxyl hydrogen is substituted with its equivalent weight of metal and in which at least one nuclear hydrogen atom of the characterizing wax-substituted aromatic nucleus is substituted with an aroxy group.

11. An improved mineral oil composition comprising a mineral oil having admixed therewith a minor proportion of an oil-miscible sulfide of the stannous carboxylate of a wax-substituted aromatic-aliphatic acid.

12. An improved mineral oil composition comprising a mineral oil having admixed therewith a minor proportion, from ⅛ percent to 10 percent, of an oil-miscible sulfide of an alkyl-substituted aromatic carboxylic acid salt in which the carboxyl hydrogen is substituted with its equivalent weight of metal.

13. An improved mineral oil composition comprising a mineral oil having admixed therewith a minor proportion, from ⅛ percent to 10 percent, of an oil-miscible sulfide of an alkyl-substituted aromatic carboxylic acid salt in which the carboxyl hydrogen is substituted with its equivalent weight of metal and in which said alkyl substituent is derived from an aliphatic hydrocarbon having at least twenty carbon atoms.

14. An improved mineral oil composition comprising a mineral oil having admixed therewith a minor proportion of a metal organic condensation product characterized by having at least once therein the grouping corresponding to the general formula

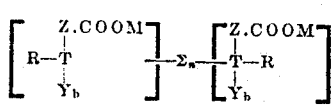

in which T represents an aromatic nucleus; Z represents a hydrocarbon radical selected from the group consisting of aliphatic and cycloaliphatic hydrocarbon radicals attached to the nucleus T; COOM represents at least one carboxyl group attached to the radical Z, the carboxyl hydrogen thereof being replaced by a metal M; R represents at least one oil solubilizing alkyl group; Y is selected from the group consisting of hydrogen, hydroxyl, metal-oxy, ester, keto, alkoxy, alkyl sulfide, aryl sulfide, aroxy, ether alcohol, aldehyde, thioaldehyde, oxime, amido, thioamido, carbamido, aralkyl, aryl, alkaryl, halogen, nitroso, amino, nitrosamino, amidino, imino, N-thio, diazo, hydrazino, cyano, azoxy, azo, and hydrazo radicals; $b$ represents the number of Y substituents and is equal to zero or a whole number corresponding to available hydrogens on the nucleus T not substituted with R, Z.COOM and $\Sigma_n$; $\Sigma$ represents an element selected from the group consisting of sulfur, selenium and tellurium; and $n$ represents a whole number from one to four.

15. An improved mineral oil composition comprising a mineral oil having admixed therewith a minor proportion of a metal organic condensation product characterized by having at least once therein the grouping corresponding to the general formula

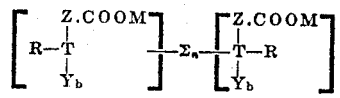

in which T represents an aromatic nucleus; Z represents a hydrocarbon radical selected from the group consisting of aliphatic and cycloaliphatic hydrocarbon radicals attached to the nucleus T; COOM represents at least one carboxyl group attached to the radical Z, the carboxyl hydrogen thereof being replaced by a metal M; R represents at least one alkyl group having at least twenty carbon atoms; Y represents a radical selected from the group consisting of hydrogen, hydroxyl, metal-oxy, ester, keto, alkoxy, alkyl sulfide, aryl sulfide, aroxy, ether alcohol, aldehyde, thioaldehyde, oxime, amido, thioamido, carbamido, aralkyl, aryl, alkaryl, halogen, nitroso, amino, nitrosamino, amidino, imino, N-thio, diazo, hydrazino, cyano, azoxy, azo and hydrazo radicals; $b$ represents the number of Y substituents and is equal to zero or a whole number corresponding to available hydrogens on the nucleus T not substituted with R, Z.COOM and $\Sigma_n$; $\Sigma$ represents an element selected from the group consisting of sulfur, selenium and tellurium; and $n$ represents a whole number from one to four.

16. An improved mineral oil composition comprising a mineral oil having admixed therewith a minor proportion of the disulfide of the stannous phenate-stannous carboxylate of wax-phenol stearic acid.

ORLAND M. REIFF.